Figure 1:
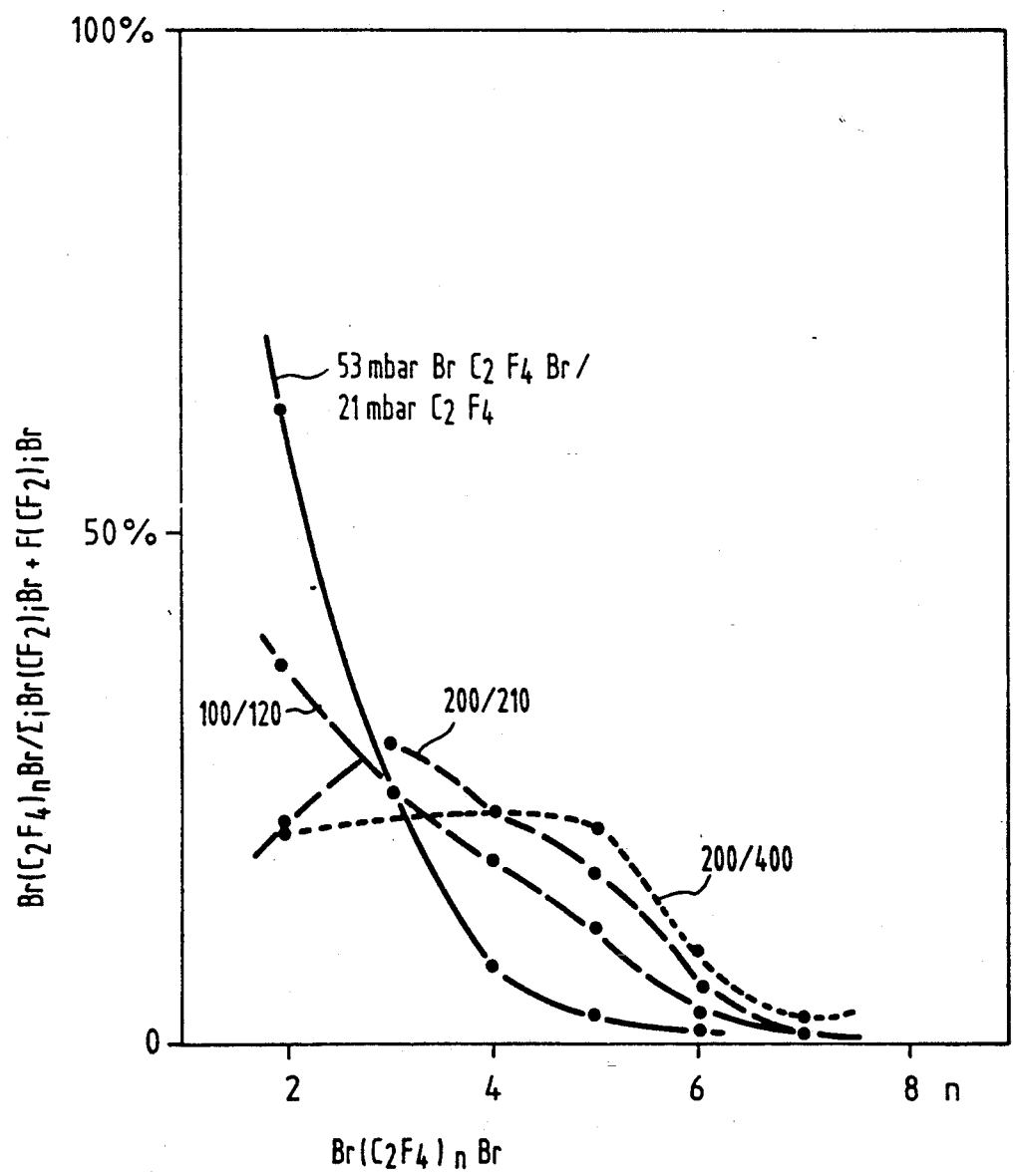

United States Patent [19]

Fuss et al.

[11] Patent Number: 5,240,574
[45] Date of Patent: Aug. 31, 1993

[54] PROCESS FOR THE PHOTOCHEMICAL PRODUCTION OF HALOGEN COMPOUNDS

[75] Inventors: Werner Fub, Garching, Fed. Rep. of Germany; Linyang Zhang, Hefei, China; Konrad von Werner, Garching/Alz, Fed. Rep. of Germany

[73] Assignee: Hoechst AG, Frankfurt, Fed. Rep. of Germany

[21] Appl. No.: 741,897

[22] Filed: Aug. 8, 1991

[30] Foreign Application Priority Data

Aug. 8, 1990 [DE] Fed. Rep. of Germany ....... 4025154

[51] Int. Cl.$^5$ ...................... C07B 37/04; C07C 17/20; C07C 19/08
[52] U.S. Cl. ............................ 204/157.94; 204/157.61; 204/157.63; 570/125; 570/170
[58] Field of Search ...................... 204/157.94, 157.61, 204/157.63, 158.11; 570/125, 170

[56] References Cited

U.S. PATENT DOCUMENTS

| | | | |
|---|---|---|---|
| 2,875,253 | 2/1959 | Barnhart et al. | 260/653 |
| 3,699,179 | 10/1972 | Boyle et al. | 570/241 |
| 5,017,718 | 5/1991 | Ojima et al. | 204/157.63 |
| 5,073,651 | 12/1991 | Raab | 570/170 |

FOREIGN PATENT DOCUMENTS 2164567 7/1973 Fed. Rep. of Germany .
48025416 12/1969 Japan .

OTHER PUBLICATIONS

Starks, C. M., "Free Radical Telomerization", Academic Press, N.Y., 1974, pp. 6–13 and 142–153.

*Primary Examiner*—John Niebling
*Assistant Examiner*—Brian M. Bolam
*Attorney, Agent, or Firm*—Nikaido, Marmelstein, Murray & Oram

[57] ABSTRACT

The present invention provides a process for the photochemical production of compounds of the general formula:

$$R—(C_2R_4')_n—X$$

by telomerisation of an alkyl halide R—X as telogen and of an olefin $C_2R_4'$ as monomer, in which R is an alkyl radical which is not halogenated or is partly or completely halogenated, R' can in each case be the same or different and, independently of one another, are hydrogen, fluorine, chlorine or bromine atoms or unsubstituted or substituted alkyl or aryl radicals, n is a natural number from 2 to 10 and X is a bromine or iodine atom, wherein
(1) a reaction mixture is produced which contains the olefin and the alkyl halide,
(2) this reaction mixture is irradiated with ultra-violet light, the wavelength of which is from 230 to 350 nm, and
(3) the end product or end products is/are recovered from the reaction mixture.

18 Claims, 6 Drawing Sheets

PROCESS FOR THE PHOTOCHEMICAL PRODUCTION OF HALOGEN COMPOUNDS

The present invention is concerned with a process for the photochemical production of organic halogen compounds by the telomerisation of an alkyl halide and of one or more olefin units with the avoidance of by-products. In particular, the present invention is concerned with a process for the production of perfluoroalkyl bromides.

A large number of methods is already known for the production of perfluoroalkyl bromides, some of which are given in the following.

Haszeldine (J. Chem. Soc., 1952, pp. 4259-4268) describes a process for the production of perfluoroalkyl bromides from silver salts of perfluorocarboxylic acids which are reacted with bromine, a perfluoroalkyl bromide shortened by one carbon atom thereby being formed.

U.S. Pat. No. 2,658,928 discloses the production of fluorocarbon monobromides from the corresponding fluorocarbon monohydrogen compounds by reaction with elementary bromine at 500° to 600° C. The hydrogen compounds are, in turn, obtained by the reaction of perfluoroalkanes with elementary hydrogen at 800° to 900° C.

Federal Republic of Germany Patent Specification No. 11 21 598 discloses a process for the production of perfluoroalkyl bromides wherein a perfluoroolefin or a halogen-substituted perfluoroolefin is reacted with bromine trifluoride or bromine pentafluoride and bromine in the presence of an inert solvent, bromine fluoride thereby being added to the double bond of the olefin. However, since the addition does not take place specifically, in the case of this process two isomers always result.

Published Federal Republic of Germany Patent Specification No. 26 29 774 discloses that perfluoroalkyl chlorides can be converted with HBr in the gas phase at 100° to 500° C. in the presence of various catalysts, including activated carbon and metal bromides, into the corresponding perfluoroalkyl bromides.

U.S. Pat. No. 4,222,968 discloses the reaction of perfluorocarboxylic acids with bromosulphonic acid fluorides at 0° to 50° C., a perfluoroalkyl bromide, fluorosulphonic acid and carbon dioxide thereby being formed as reaction products.

As a method of production for perfluoroalkyl bromides, U.S. Pat. No. 4,469,623 discloses the thermal decomposition of perfluoroalkylsulphonyl bromides which, in turn, can be produced from the corresponding perfluoroalkylsulphonyl fluorides. According to U.S. Pat. No. 2,732,398, these compounds can, in turn, be obtained by electrochemical fluorination.

The above-mentioned processes all display the disadvantages that halogens, hydrogen halides or similar dangerous substances are used as reaction components and, in addition, in some cases drastic reaction conditions are necessary.

The so-called telomerisation is a further technique for the production of organic molecules and especially of alkyl halogen compounds of medium chain length. This is a polymerisation of olefins (equation 1), which almost always takes place via radicals, coupled with a chain transfer reaction (equation 2). With the use of ethylene as an example of an olefin, the two reactions of the telomerisation are as follows:

$$R(C_2H_4)_{n-1} + C_2H_4 \rightarrow R(C_2H_4)_n \quad (1)$$

$$R(C_2H_4)_n + RX \rightarrow R(C_2H_4)_nX \quad (2)$$

The starting radical R of the telomerisation results from the telogen R—X, which is very frequently a halogen compound, in which X can be, for example, chlorine, bromine or iodine. R can be produced thermally with or without a radical starter or also photochemically. A detail review of telomerisation is to be found in Starks, Free radical telomerization, pub. Academic Press, 1974.

The production of perfluoroalkyl bromides by telomerisation is itself known. Thus, U.S. Pat. No. 2,875,253 discloses the telomerisation of perfluoroalkyl bromides or iodides with unsaturated fluorinated compounds at 0° to 200° C. in the presence of a peroxy catalyst. Published Federal Republic of Germany Patent Specification No. 24 16 261 discloses the conversion of short-chained perfluoroalkyl bromides in the gas phase at temperatures of 250° to 500° C. without catalyst in the presence of glass rings or metal turnings with tetrafluoroethylene into longer-chained perfluoroalkyl bromides.

However, in the case of the above-described telomerisation processes, a uniform product is not obtained. On the contrary, there is obtained a product mixture with a wide molecular weight distribution, the individual components of which contain a differing number n of olefin units, the average number n of the olefin units in the product mixture thereby depending upon the ratio of the velocities of the reaction equations (1) and (2). The average molecular weight of the telomerisation products can thus be controlled to a certain extent by the ratio of the concentrations of olefin to R—X. However, this method comes up against a limit when this ratio differs too much from the stoichiometric ratio of the olefin to R—X which is required by the end product.

Furthermore, in the case of usual telomerisation processes, those by-products also arise which differ from the starter radical R by an uneven number of $CF_2$ groups and products which carry a fluorine atom instead of X, i.e. undesired by-products which additionally reduce the yield of desired products.

As starter compounds R—X for the telomerisation reaction, in the case of known processes, there are preferably used iodine compounds, for example $CF_3I$, $C_2F_5I$ and $IC_2F_4I$, since these compounds can enter very easily into telomerisation reactions with olefins, for example ethylene or tetrafluoroethylene (see Starks, supra). The reaction can be initiated thermally or photochemically. The products thereby resulting can be converted into a large number of other products, for example:

$$RC_2H_4I \rightarrow RC_2H_4OH \quad (3)$$

$$RC_2H_4I \rightarrow R-CH=CH_2 \rightarrow R-COOH \quad (4)$$

$$2RI + Zn \rightarrow R_2 + ZnI_2 \quad (5)$$

$$RI + Hal_2 \rightarrow RHal + Hal\text{-}I \ (Hal = Br, Cl, F) \quad (6).$$

However, the use of iodine compounds also gives rise to disadvantages which are due to the relatively high price, the initiation of corrosion due to the accompanying decomposition product iodine and the toxicity of some compounds, for example $IC_2F_4I$. These disadvantages could be avoided if, instead of the iodine compounds, it were possible to use the corresponding bromine compounds since a decomposition to bromine practically does not occur. Furthermore, reaction (6) has the disadvantage that the handling of the there-mentioned halogens in comparatively large amounts is difficult and dangerous and is subject to the hazard regulations. If, however, a bromide is used as starting material, reaction (6) would be unnecessary insofar as a bromide, for example a perfluoroalkyl bromide, is desired as product.

However, alkyl bromides as starting material R—X are not very reactive at 20° C., especially for the chain transfer reaction in equation (2). Thus, in the case of the telomerisation, there preferably result high molecular weight, wax-like polymers. In the case of comparatively high reaction temperatures, the average molecular weight of the product mixture is admittedly smaller but many by-products result. Therefore, because of these problems, the direct telomerisation of R—Br with a perfluorinated olefin, for example tetrafluoroethylene, is, in practice, not used for the production of perfluoroalkyl bromides.

Thus, it is an object of the present invention to provide a process which at least partly overcomes the disadvantages of the prior art. In particular, it is an object of the present invention to provide a process in which is obtained an increased yield of the desired products with the widest possible avoidance of by-products.

According to the present invention, there is thus provided a process for the photochemical production of compounds of the general formula:

$$R-(C_2R_4')_n-X$$

by telomerisation of an alkyl halide R—X as telogen and of an olefin $C_2R_4'$ as monomer, in which R is an alkyl radical which is not halogenated or is partly or completely halogenated, R' can be the same or different and, independently of one another, are hydrogen, fluorine, chlorine or bromine atoms or unsubstituted or substituted alkyl or aryl radicals, n is a natural number from 2 to 10 and X is a bromine or iodine atom, wherein
(1) a reaction mixture is produced which contains the olefin and the alkyl halide,
(2) this reaction mixture is irradiated with ultra-violet light, the wavelength of which is from 230 to 350 nm,
(3) the end product or end products is/are recovered from the reaction mixture.

In the process according to the present invention, an alkyl halide R—X is used as telogen, i.e. as radical former. X can be an iodine or bromine atom and is preferably a bromine atom. R can be an alkyl radical which is not halogenated or is partly or completely halogenated and preferably contains up to 12 and more preferably up to 8 carbon atoms. Examples for R—X include $CF_3X$, $C_2F_5X$, $XC_2F_4X$, $CH_3X$, $CX_2F_2$, $ClCF_2CF_2X$, $(CF_3)_2CFX$ and also larger molecules, such as $C_8F_{17}X$ and $C_6F_{13}X$. R is preferably a perhalogenated alkyl radical and especially preferably a perfluorinated alkyl radical or an alkyl radical which is substituted with a bromine, chlorine or iodine atom but is otherwise completely substituted with fluorine atoms. Especially preferred as telogens for the process according to the present invention are $CF_3Br$, $C_2F_5Br$, $BrC_2F_4Br$, $CBr_2F_2$, $ClCF_2CF_2Br$, $(CF_3)_2CFBr$, $C_8F_{17}Br$ and $C_6F_{13}Br$, the most preferred compounds being $CF_3Br$, $C_2F_5Br$ and $BrC_2F_4Br$.

The olefin used as monomer in the process according to the present invention has the general formula:

$$C_2R_4'$$

In each case, R' can be the same or different and, independently of one another, are hydrogen, fluorine, chlorine or bromine atoms or unsubstituted or substituted alkyl or aryl radicals. Preferred examples for olefins which can be used for the process according to the present invention include $C_2F_4$, $C_3F_6$, $C_2H_4$, $CF_2=CFCl$ and $CH_2=CF_2$. Quite generally, olefins are especially suitable which are accessible to radical polymerisation and are volatile since the process according to the present invention is preferably carried out in the gas phase. Perfluorinated olefins are preferred and especially tetrafluoroethylene. In the process according to the present invention, it is also possible to use two different monomers, for example ethylene and tetrafluoroethylene.

The number of olefin units in the end product n is preferably from 2 to 10. Since the composition of the product mixture produced in the process according to the present invention also depends upon the concentration ratio of alkyl halide to olefin, this ratio will be chosen according to the desired end product. Thus, a higher alkyl halide concentration and/or a lower olefin concentration must be used when a product is desired of small chain length, i.e. small n.

The reaction according to the present invention is preferably carried out in the gas phase. The pressure used is upwardly limited by the vapour pressure of the bromide or iodide and by the requirement that the olefin is not to be used in large excess in order not to let the molecular weight become too great. The total pressure of the reaction components is preferably from 10 mbar to 2 bar (1 kPa to 200 kPa).

However, the process according to the present invention can also be carried out in liquid phase, possible in solution. Solvents can thereby be used which do not react or scarcely react with radicals and which do not absorb substantially at the wavelength of the irradiation. Examples of solvents which can be used include n-octane, cyclohexane, $CFCl_2-CF_2Cl$, acetonitrile, tert.-butanol and $CF_3C_6H_5$ or $C_6F_{13}C_6H_5$ (the latter two only in the case of irradiation wavelengths greater than 300 nm). Non-polar solvents, including the starting bromide or iodide, thereby increase the proportion of higher telomerisation products, whereas polar solvents and especially tert.-butanol and acetonitrile lower the average molecular weight of the telomerisation products.

As sources of ultra-violet light, in principle there can be used all light sources which emit ultra-violet light in the wavelength range suitable according to the present invention. In particular, light sources with high intensity are preferred since an increase of the intensity or irradiation surprisingly brings about a reduction of the proportion of high molecular weight by-products in the reaction product mixture. Thus, for the process according to the present invention, there is preferably used a laser, for example a KrF laser (wavelength 248 nm). As light source there can also be used an XeCl laser (wavelength 308 nm), namely, especially for starting compounds R—X in which X is an iodine atom, as well as for the liquid phase where the greater wavelength results in a greater penetration depth.

However, a low pressure mercury lamp (main emission line 253.7 nm) can also be used when the 184.9 nm line is filtered away, for example with a type of quartz glass which is unsuitable for vacuum UV, such as Heralux, or with a liquid such as methanol or glycol which can simultaneously also serve as cooling medium for the lamp. Use can also be made of high pressure mercury lamps (particularly the emission band with a maximum at 246 nm) in combination with one or more filters for short-waved Ultra-violet light (below 230 nm). An Xe short arc lamp in combination with a filter which is substantially non transparent for ultra-violet light with a wavelength below 230 nm can also be used.

For the filtering out of undesired wavelengths of the ultra-violet light, it is preferred to use, besides the already-mentioned filters, especially dielectric mirrors with a reflection range of 248 ±15 nm (usual as laser mirrors) and, somewhat less good because of transmission losses, band pass filters which are available in many variants, for example in combination with mercury lamps.

The ultra-violet light suitable for the process according to the present invention is to have a wavelength of from 230 to 350 nm. Surprisingly, it has been ascertained that in the case of irradiation of the reaction mixture with an unfiltered source of ultra-violet light which emits irradiation with a wavelength below 230 nm, there always occurs a certain proportion of undesired by-products with an uneven carbon number, i.e. instead of a complete olefin unit $C_2F_4$, the product only contains one $CF_2$ group, or occurs with fluorine instead of bromine. The formation of these undesired by-products can be avoided when, according to the process of the present invention, the shortwave part of the ultra-violet light below 230 nm is filtered off. Furthermore, it has been ascertained that, in the case of a bromide as telogen, an especially preferably useable range of the source of ultra-violet light lies between 230 and 270 nm and, in the case of an iodide as telogen, lies between 230 and 350 nm, whereby, however, depending upon the halide used, this range can also be somewhat narrower or broader. A wavelength of 250±15 nm has proved to be especially favourable for the process according to the present invention.

After ending of the telomerisation reaction according to the present invention, the desired end product or products is/are separated from the reaction mixture. The separation of the reaction mixture and the purification of the products can thereby take place in a usual and known manner, for example especially by fractional distillation, extraction, fractional precipitation and/or by chromatographic methods.

Furthermore, it has been ascertained that the intensity of the irradiation has an influence of the average molecular weight of the product mixture. In the case of higher irradiation intensities, shorter chain lengths are found than in the case of lower irradiation intensities. This can naturally be utilised for increasing the yield for a desired product in a particular process. Thus, in the case of irradiation of a 1:1 gas phase mixture of $BrC_2F_4Br$ and $C_2F_4$ (total pressure 200 mbar) with a KrF laser (wavelength 248 nm, pulse length 20 ns) with an energy density of 10 mJ/cm$^2$, it is found that the resultant telomerisation product consists of up 90% of $Br(C_2F_4)_2Br$. In the case of irradiation of the same mixture with radiation between 230 and 270 nm (filter) from a 1 kW xenon short arc lamp, concentrated to an intensity of 0.3 W/cm$^2$ on the entry window of the irradiation cell, there results, on the other hand, a product mixture with a higher average chain length consisting of $Br(C_2F_4)_nBr$ with 37% n=2, 25% n=3, 18% n=4 and 12% n=5. Furthermore, if the same starting mixture is used but a low pressure mercury immersion lamp with 0.1 W/cm$^2$ radiation strength at 253.7 nm on the surface, besides the above products there are already found 5% of wax-like polymers.

The average molecular weight was reduced in a similar manner when the absorbed energy is increased by choice of a wavelength which is more strongly absorbed. Thus, in the case of irradiation of $BrC_2F_4Br + C_2F_4$ (in each case 200 mbar) with a XeCl laser (wavelength 308 nm, weak absorption), wax-like polymers are observed, whereas in the case of irradiation with a KrF laser (248 nm, about 1000 times stronger absorption), in the case of the same laser energy the main product was $BrC_4F_8Br$.

In the case of the process according to the present invention, it has proved to be especially favourable to carry out the reaction in a gas phase and, during the reaction, to cycle the mixture of reactants and products in a circulating system with a cold trap. The temperature of the cold trap is thereby so chosen that the desired end product condenses out, whereas the more volatile components of the reaction mixture are again returned to the radiation zone. In this way, it is achieved that, after a few circulations, the products have a substantially uniform molecular weight. This means that the desired product can be obtained in very high yield. If, for example, the telomerisation of $BrC_2F_4Br$ and $C_2F_4$ is carried out as above with the use of a 1 kw Xenon short arc lamp as source of ultraviolet light (irradiation wave length between 230 and 270 nm) but with a reduction of the $C_2F_4$ pressure by a half (to 50 mbar), adding repeatedly 50 mbar $C_2F_4$ thereto, if necessary, i.e. with progressive reaction, and circulating the product mixture between the irradiation cell and a cold trap at 5° C., then, in the case of almost complete reaction, there is obtained a mixture of 45% each of $Br(C_2F_4)_2Br$ and of $Br(C_2F_4)_3Br$, the last mentioned compound thereby forming 82% of the end products which are not again returned into the irradiation zone by the circulating system.

In the case of the process according to the present invention, a radical starter compound can possibly also be present. As radical starters, there can be used perfluorinated diacyl peroxides, for example bis-(trifluoroacetyl) peroxide or bis-(pentafluoropropionyl) peroxide. The concentration of these radical formers can be in the range of from 0.01 to 1%, referred to the total mole number of the reaction participants.

The reaction temperature lies substantially below the temperature at which the reaction proceeds spontaneously; thus in the case of bromides below 400° C. and in the case of iodides below 150° C. However, it is also preferably above 0° C. Especially preferably, in the case of bromides it is from 25° to 200° C. and in the case of iodides from 25° to 100° C.

A series of valuable compounds can be produced with the process according to the present invention. Thus, for example, $\alpha,\omega$-dihaloperfluoroalkanes of the type $X(CF_2CF_2)_nX$, in which X is an iodine or bromine atom and n is preferably 3 or 4, are valuable intermediates for the synthesis of $\alpha,\omega$-difunctional compounds, such as dicarboxylic acids, diols, dienes and the like.

According to the present invention, such compounds can be obtained by the telomerisation of $BrC_2F_4Br$ and $C_2F_4$. An exchange of X for chlorine or fluorine or a coupling of the end products, for example a reaction of the iodides with zinc in acetic anhydride, gives inert liquids or inert waxes: thus, for example, $C_{16}F_{34}$ is a special ski wax.

Perfluoroalkyl bromides, for example $C_6F_{13}Br$, $C_8F_{17}Br$, $C_9F_{19}Br$, $BrC_6F_{12}Br$, find a further use as X-ray contrast agents not only in blood vessels but also, for example, in the intestines, as ultrasonic contrast agents, as oxygen carriers and for fluorine nuclear magnetic resonance tomography for the recognition and combating of cancer and cancer cells. However, of most importance is the use of mono- and dibromoperfluoroalkanes with vapour pressures of 5 to 50 mbar as blood replacement materials. Such compounds can be produced purposefully and with substantial avoidance of by-products from $CF_3Br$, $BrC_2F_4Br$ or $C_2F_5Br$ and $C_2F_4$.

Figure 2:
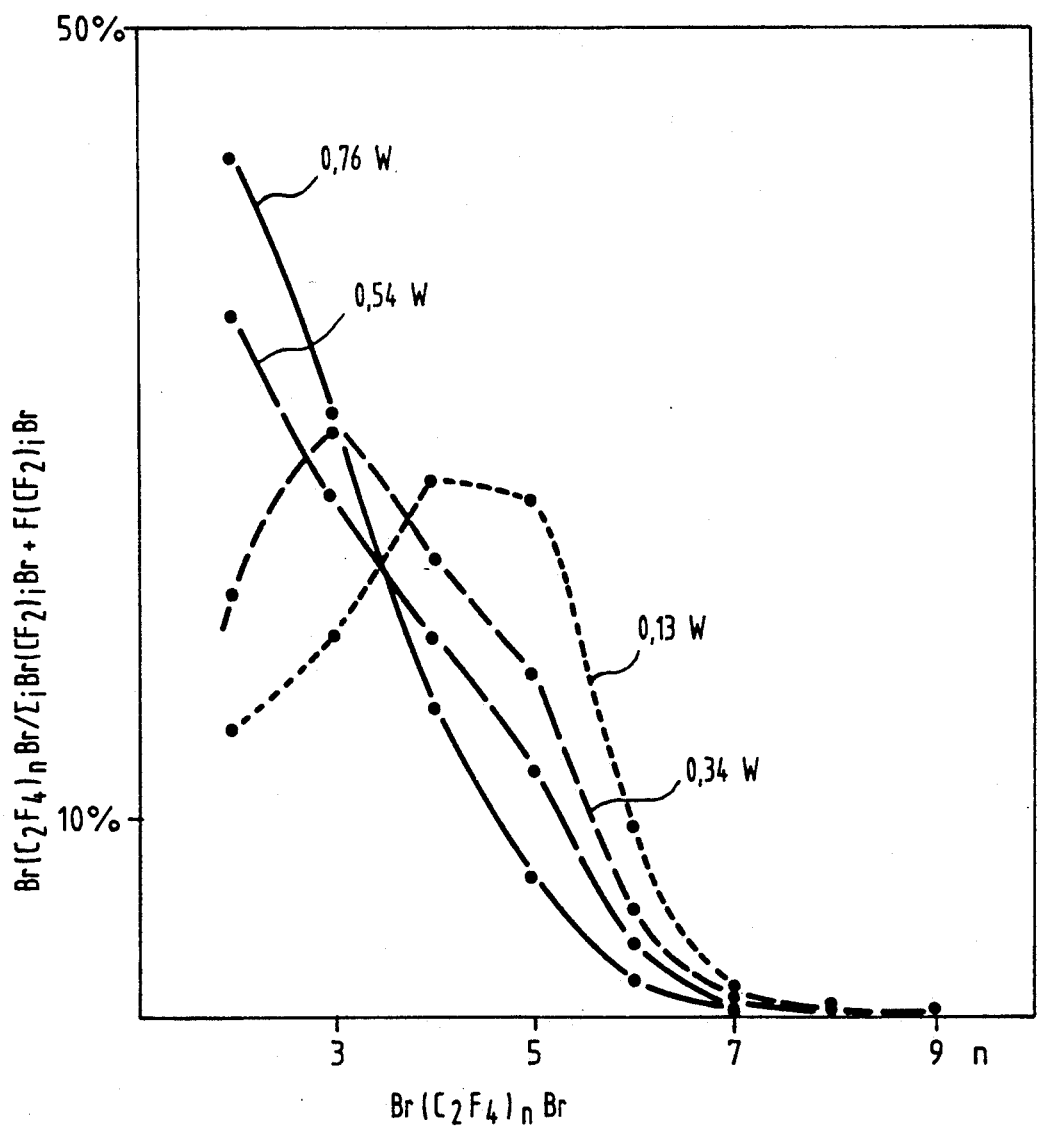
Figure 3:
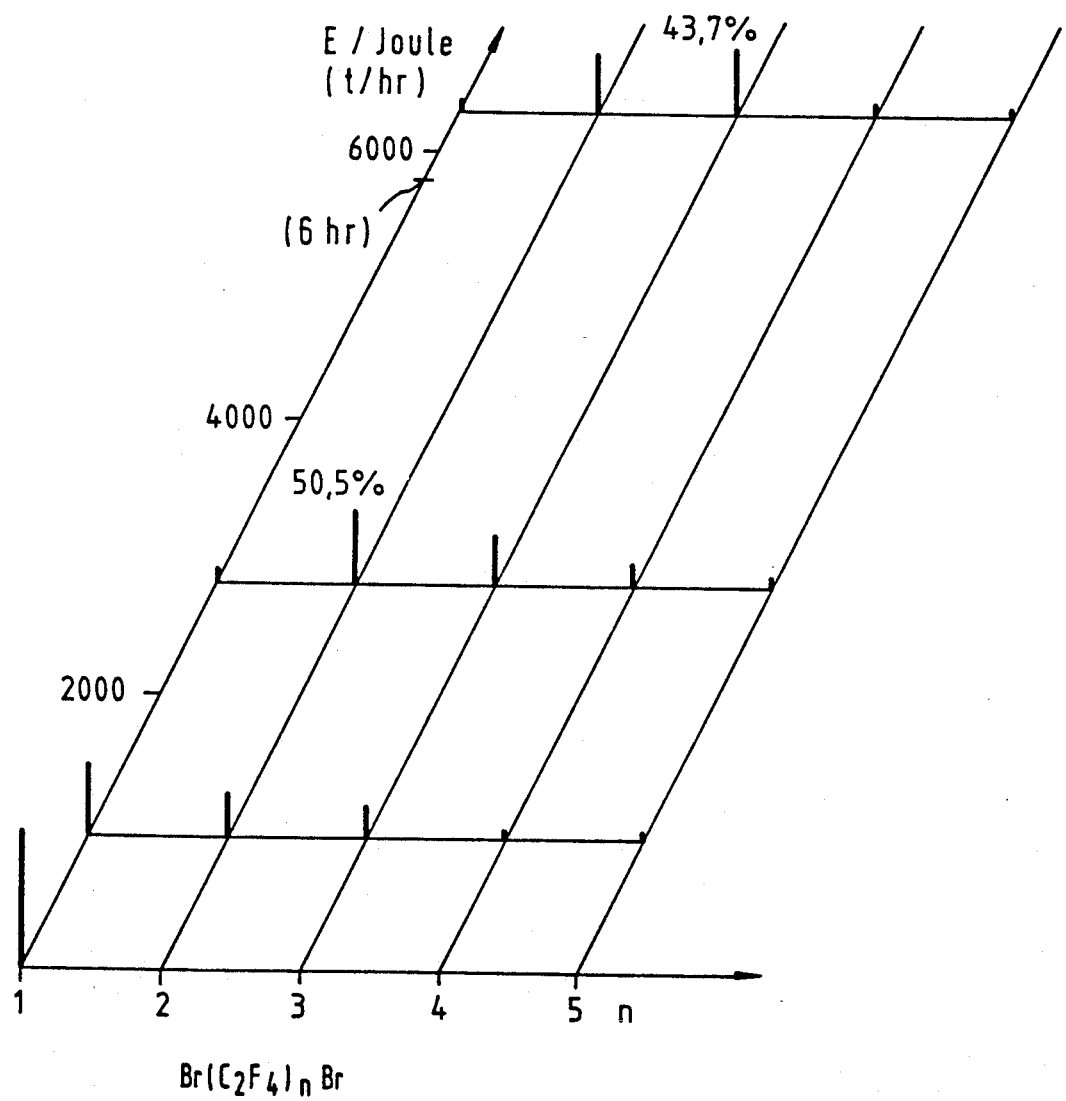
Figure 4:
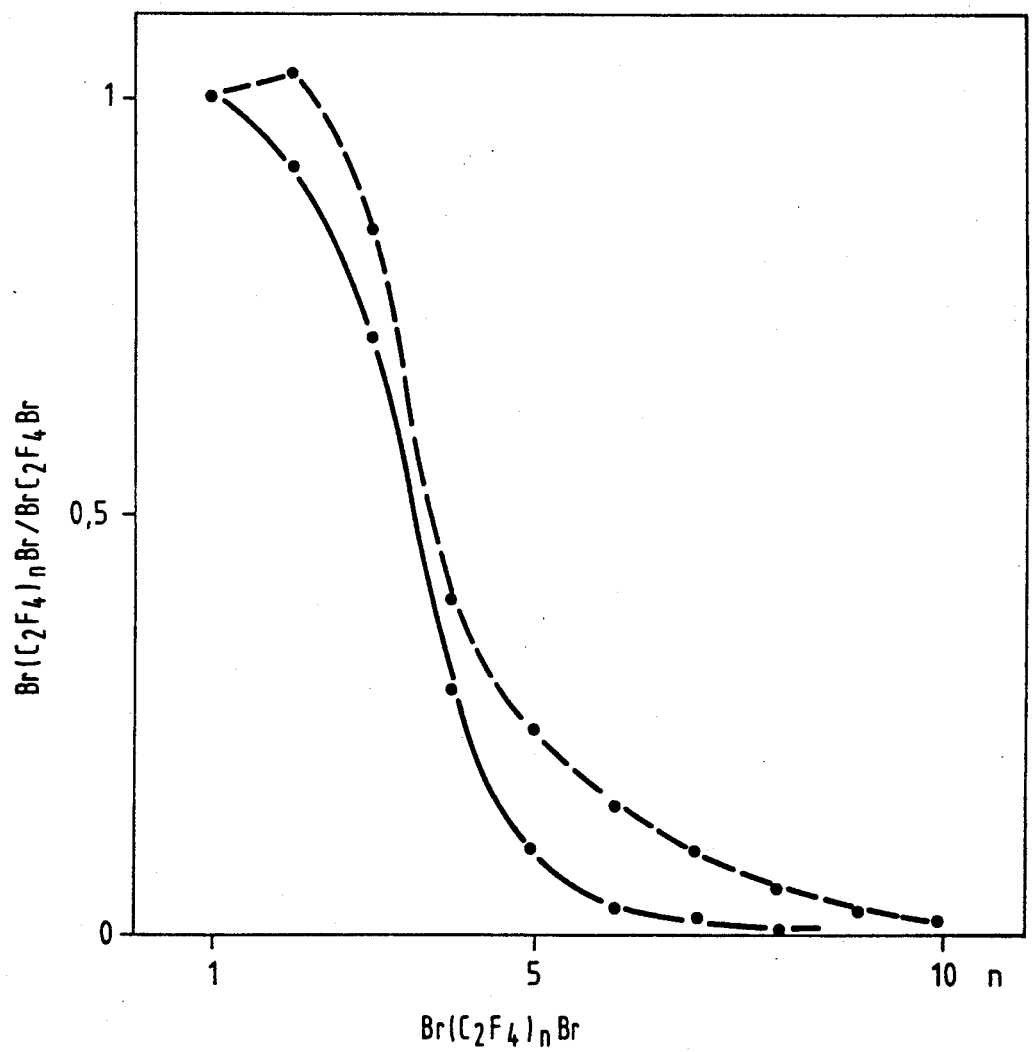
Figure 5:
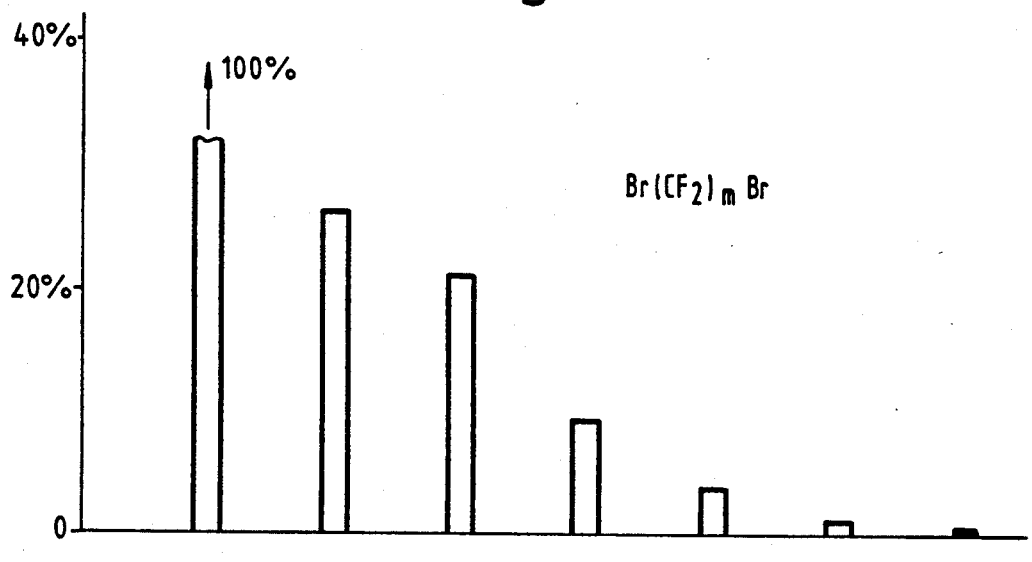
Figure 5:
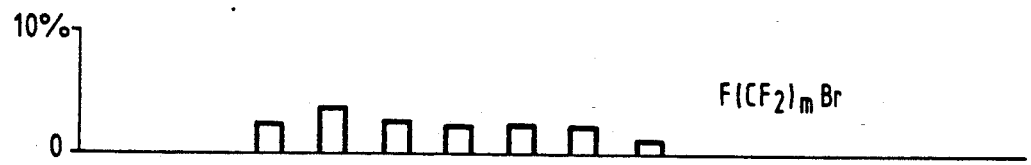
Figure 5:
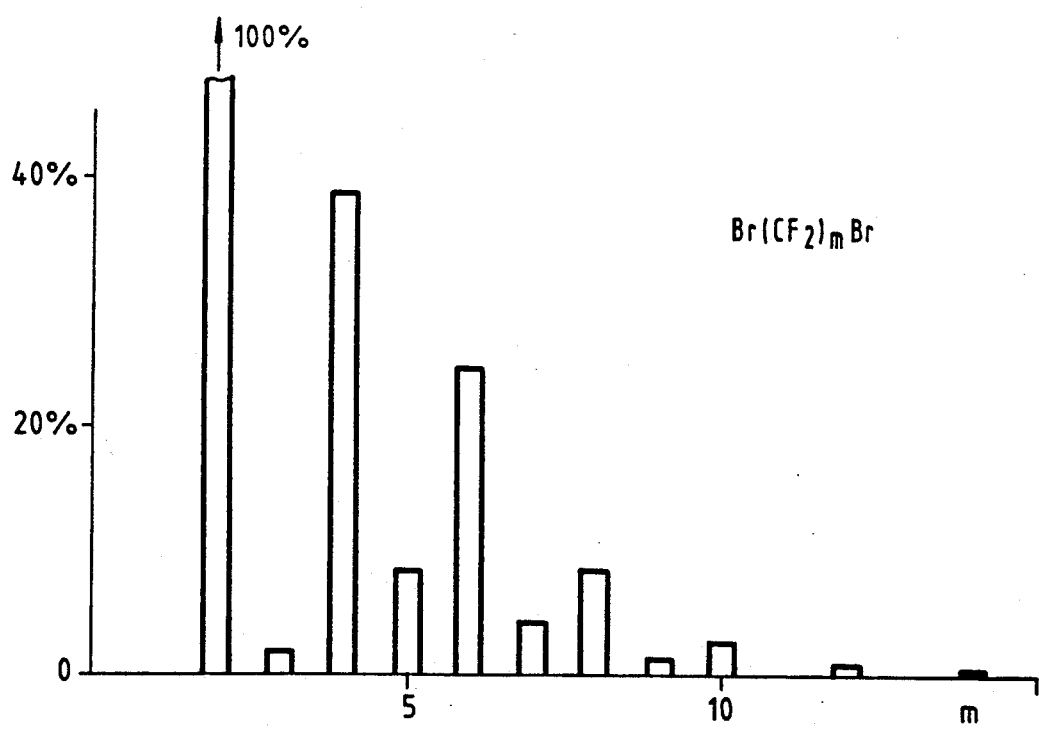
Figure 6:
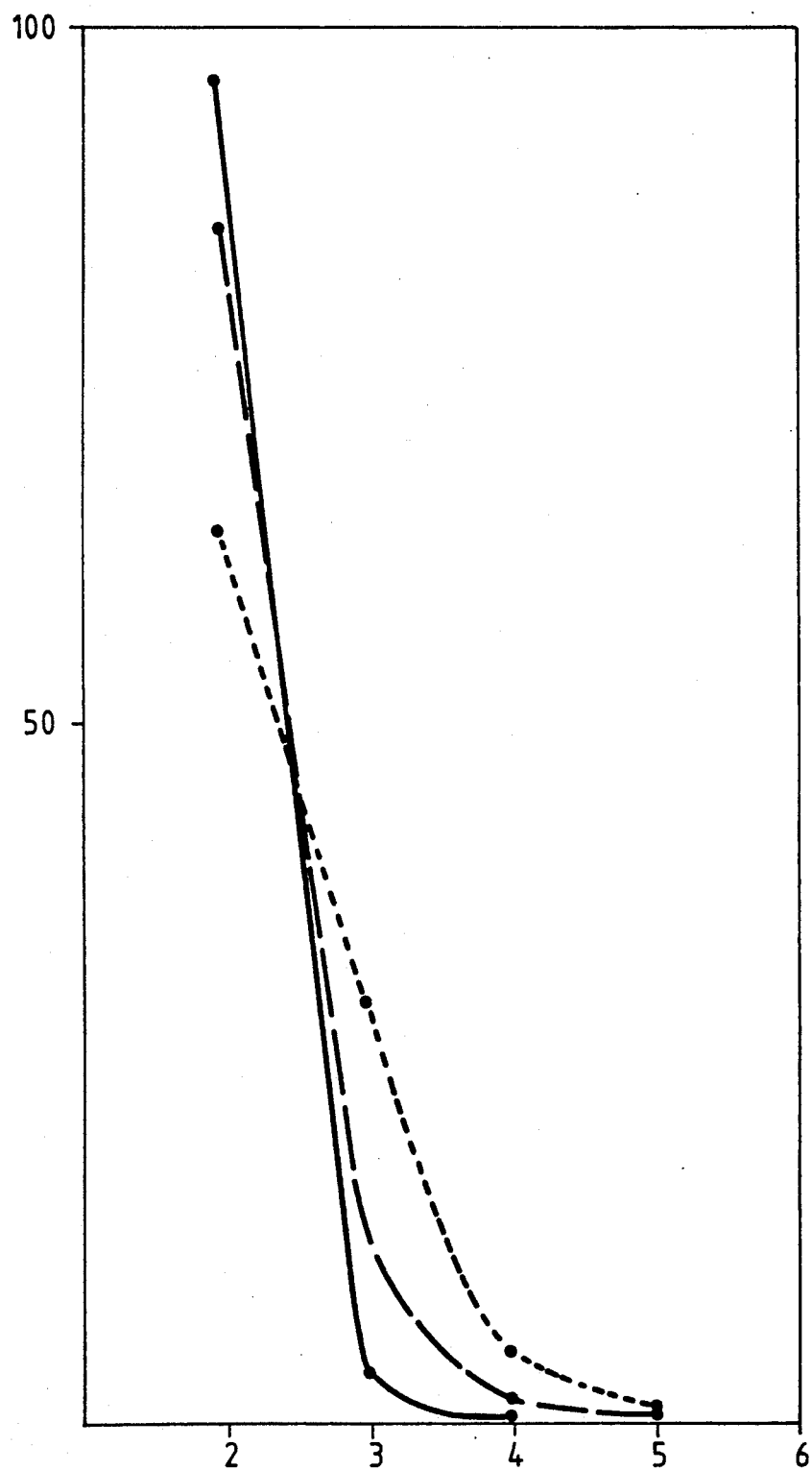

The following Examples are given for the purpose of illustrating the present invention, reference being made to the accompanying drawings in which:

FIG. 1 shows the product composition in the case of irradiation of $BrC_2F_4Br+C_2F_4$ with a Xe short arc lamp in dependence upon the initial composition, FIG. 2 shows the product composition of the same system as in FIG. 1 in dependence upon the intensity of irradiation, FIG. 3 shows the same system as in FIG. 1 with the use of a circulation system in dependence upon the period of irradiation, FIG. 4 shows the product composition in the case of irradiation of $BrC_2F_4Br+C_2F_4$ with a low pressure mercury lamp with and without gas circulation, FIG. 5 shows the same system as in FIG. 4 without (below) and with (above) filter, and FIG. 6 shows the product composition in the case of irradiation of $BrC_2F_4Br+C_2F_4$ with a KrF laser without gas circulation.

EXAMPLE 1

Irradiation with a Xe short arc lamp.

For the irradiation of a reaction mixture consisting of $C_2F_4+BrC_2F_4Br$ with a Xe short arc lamp (Osram XBO 1000 watt/HS.OFR) or with a high pressure mercury lamp (Osram HBO 500 watt/2), there was used a cylindrical irradiation cell of 10 cm. length and 3.6 cm. diameter with windows of quartz glass. The reaction temperature was 25° C.

The cell has two gas connections. In the case of the circulation of the gas, as gas entry there was used the connection close to the irradiation window in order to flush away depositions which, under circumstances, arise. Besides the irradiation cell, the circulation system also contains a cold trap and a circulation pump (Brey, TFK1M, oil-free vane-type rotary pump with graphite rotor) which was operated with a speed of 0.2 l/sec. The lamps were operated with a mains supply and a housing (Amko A 5001) which had a focussing mirror with 20 cm. focal distance and f number 2.5.

For the high pressure lamps, there was used a dielectric mirror which reflected more than 90% of the light between 233 and 263 nm, whereas the reflection for the other wavelengths lay substantially below 5%.

The products were analysed gas chromatographically in combination with a mass spectrometer. As column there was used a 0.2 mm. * 25 mm. capillary which was coated with 5% phenylmethylsilicone. Temperature programme: 2 min. 30° C., then with 5 K/min. to 200° C. For the mass spectrometer sensitivity (total ionic current of mass 23 to 800), there was taken the group additivity: The relative signal of several calibration compounds can be well represented as the sum of contributions of 0.25, 0.40, 1.00 and 1.10 of the groups Br, $CF_3$, $C_2H_4$ and $C_2F_4$, respectively.

FIGS. 1 to 3 show the product compositions under different reaction conditions. FIG. 1 demonstrates the influence of the concentration ratio halide/olefin. Conversion and associated quantum yields were, with increasing olefin pressure, 11% and 0.7, 12% and 1.7, 15 and 2.1 or 7% and 2.1.

FIG. 2 shows the influence of the irradiation intensity. The initial pressures for halide and olefin were, in each case, 200 mbar. The parameters on the curves give the ultraviolet power (230 to 270 nm) on the entry window of the irradiation cell. The conversion of the bromide amounted to between 9% (0.13 W) and 14% (0.76 W). The associated quantum yield was 2 to 2.3. In the case of the experiments illustrated in FIGS. 1 and 2, the circulation system was not used and the conversion of the initial bromide kept low (0 to 15%).

On the other hand, FIG. 3 shows the product compositions with increasing conversion of the bromide (up to 96%) in the case of circulation with cold trap (5° C.) and with repeated making up of $C_2F_4$ according to the measure of the consumption, i.e. of the pressure drop. The irradiation time is interrelated with the irradiation energy (both plotted on the oblique coordinates) via the irradiation power (0.27 watt in the UV). The height of the first bar (at time point 0) corresponds to 100% of the starting bromide and gives the scale for the vertical coordinate (composition). The bromide initial pressure amounted to 100 mbar and the olefin addition to 4×65 mbar. The conversion of the bromide amounted to 96% and the associated quantum yield to 0.7.

EXAMPLE 2

Irradiation with a low pressure mercury lamp

In the experiments with the low pressure mercury lamp, there was used an immersion lamp Heraeus TNN 15/32 (15 W electrical, 3 W UV, 0.1 W/cm² on the surface). For the absorption of the 185 nm line, methanol (layer thickness 3 mm.) was filled into its protective mantle. The lamp was dipped into a 4.5 liter three-necked flask, the two other necks of which were connected with the circulation system (see Example 1). The starting mixture consisted of 100 mbar $BrC_2F_4Br+20$ mbar $C_2F_4$. The two gases were supplemented according to the amount of consumption. In total, the amount of starting material was 20 g. As liquid products, in total there were obtained 12.5 g. The conversion of the bromide amounted to 68 and 74%, respectively. In FIG. 4, there is given the product composition without gas circulation as a solid line and with gas circulation as a broken line. In the case of the use of circulation, the reduction of the high molecular weight products can clearly be seen. In comparison with the Xe lamp, the products which result in the case of the use of the low pressure mercury lamp as ultra-violet source contain one more $C_2F_4$ unit.

FIG. 5 shows the difference of the product composition with and without methanol filter. Here, a small quartz cell (65 ml.) was illuminated externally, without gas circulation and with a conversion of the bromide of 38 or 51% with or without methanol, respectively. No monobromides and no uneven carbon numbers were observed with methanol as filter. The initial pressure of the bromide was 100 mbar. The olefin was added in three portions (50+48+28 mbar) according to the amount of consumption. In both cases, the irradiation time was 15 minutes.

EXAMPLE 3

Irradiation with a KrF laser

In the case of the experiments with a KrF laser (Lambdaphysik EMG 102), the cell and the circulation system of Example 1 were used. The laser energy on the entry window was 40 mJ/pulse in the case of a pulse period of 20 ns. The beam cross-section was 2.8 cm$^2$.

FIG. 6 shows some examples of the product composition after irradiation of $BrC_2F_4Br + C_2F_4$ in the case of about 33% conversion of the bromide without gas circulation. The statement of $4 \times 50$ mbar $C_2F_4$ in the case of the dotted curve means that the olefin was added in 4 portions according to the amount of consumption. The conversion of the bromide and the associated quantum yields were, in the case of the unbroken curve, of the broken-line curve and of the dotted line curve, 20% and 1.8, 32% and 1.6 and 72% and 0.7, respectively. Independently of the composition of the starting mixture, the product $BrC_4F_8Br$ always predominated by far (85–93%).

EXAMPLE 4

Further telomerisation experiments were carried out with a KrF laser, the laser and the irradiation cell being as in Example 3. Irradiation was carried out up to 15% conversion of the bromide in each case. The circulation system was not used.

In the case of irradiation of 200 mbar $CF_3Br + 400$ mbar $C_2H_4$, there result 93% $CF_3C_2H_4Br$, 3.2% $CF_3C_4H_8CF_3$ and 2.5% $CF_3C_4H_8Br$. With 25 instead of 400 mbar $C_2H_4$, there are obtained 94% $CF_3C_2H_4Br$, 1.5% $CF_3C_4H_8CF_3$ and about 4% $C_2F_6$.

The telomerisation of $C_2F_5Br$ and $C_2H_4$ showed precisely corresponding results.

In the case of irradiation of 200 mbar $BrC_2F_4Br + 400$ mbar $C_2H_4$ with 90 mJ and 4 mJ pulses of a KrF laser, respectively, there were obtained the following product compositions:

| laser energy | 90 mJ | 4 mJ |
|---|---|---|
| $BrC_2F_4C_2H_4Br$ | 47% | 33.8% |
| $BrC_2F_4C_4H_8C_2F_4Br$ | 20.7% | 42.3% |
| $BrC_2F_4C_2H_4C_2F_4Br$ | 16.0 | 3.8% |
| $BrC_4F_8Br$ | 7.8% | 3.6% |
| $BrC_2F_4C_4H_8Br$ | 3.1% | 6.3% |
| $BrC_2F_4C_2H_3$ | 2.5% | 5.1% |
| $BrC_2F_4C_2H_5$ | 2.5% | 5.1% |
| quantum yield of the main product | 1.4 | 4.5 |

If 125 mbar $C_2F_4$ are additionally added to the reaction mixture (laser 20 mJ), then $BrC_2F_4C_4H_8C_2F_4Br$ results with a quantum yield of 93 and a selectivity of 78%.

From 6 mbar $BrC_2F_4C_2H_4Br + 100$ mbar $C_2H_4$, there result in the case of 25 mJ laser energy:

| | |
|---|---|
| $BrC_2H_4C_2F_4C_2H_4Br$ | 60% (quantum yield 0.4) |
| $BrC_2F_4C_4H_8C_2F_4Br$ | 30% |
| $BrC_2F_4C_4H_8C_2F_4C_2H_4Br$ | 6.5% |
| $BrC_2F_4C_4H_8Br$ | 3.5% |

With much lower irradiation intensities such as, for example from a mercury low pressure lamp, the main product is $BrC_2F_4C_4H_8Br$.

We claim:

1. Process for the photochemical production of compounds of the general formula:

$$R—(C_2R_4')_n—X$$

by telomerisation of an alkyl halide R—X as telogen and of an olefin $C_2R_4'$ as monomer, in which R is an alkyl radical which is not halogenated or is partly or completely halogenated, R' can in each case be the same or different and, independently of one another, are hydrogen, fluorine, chlorine or bromine atoms or unsubstituted or substituted alkyl or aryl radicals, n is a natural number from 2 to 10 and X is a bromine or iodine atom, wherein
   (1) a reaction mixture is produced which contains the olefin and the alkyl halide,
   (2) this reaction mixture is irradiated with ultra-violet light, the wavelength of which is from 230 to 350 nm, and
   (3) the end product or end products is/are recovered from the reaction mixture.

2. Process according to claim 1, wherein an alkyl bromide R—Br is used a telogen.

3. Process according to claim 1, wherein a mono- or dibromoperfluoroalkane is used as telogen.

4. Process according to claim 1, wherein $CF_3Br$, $C_2F_5Br$, $BrC_2F_4Br$, $CBr_2F_2$, $ClCF_2CF_2Br$, $(CF_3)_2CFBr$, $C_8F_{17}Br$ ot $C_6F_{13}Br$ is used as telogen.

5. Process according to claim 1, wherein $C_2F_4$, $C_2H_4$, $C_3F_6$, $CF_2=CFCl$ or $CH_2=CF_2$ is used as olefin.

6. Process according to claim 4, wherein $BrC_2F_4Br$ is used as telogen and $C_2F_4$ as olefin.

7. Process according to claim 4, wherein $CF_3Br$ or $C_2F_5Br$ is used as telogen and $C_2F_4$ as olefin.

8. Process according to claim 4, wherein $C_8F_{17}Br$ or $C_6F_{13}Br$ is used as alkyl halide and $C_2H_4$ as olefin.

9. Process according to claim 1, wherein there is used a source of ultra-violet light with high irradiation intensity.

10. Process according to claim 9, wherein a laser is used as source of ultra-violet light.

11. Process according to claim 10, wherein a KrF laser with a wavelength of 248 nm is used as source of ultra-violet light.

12. Process according to claim 9, wherein an XeCl laser with a wavelength of 308 nm is used.

13. Process according to claim 1, wherein the reaction is carried out in the gas phase.

14. Process according to claim 13, wherein the reaction mixture is cycled in a circulation system with a cold trap for the condensation of components of the product mixture of low volatility.

15. Process according to claim 1, wherein the reaction is carried out in the presence of 0.01 to 1% of a perfluorinated diacyl peroxide, referred to the total mole number of the reaction participants.

16. Process according to claim 1, wherein the reaction is carried out at 0° to 200° C. when the telogen is a bromide and at 0° to 100° C. when the telogen is an iodide.

17. Process according to claim 16, wherein the reaction is carried out at a temperature of at least 25° C.

18. The product produced by the process of claim 1 which product has a higher purity in the as produced condition than would the product of the reaction of the same reactants carried out under the influence of ultra violet light which was not restricted to a wave length of 230 to 350 nm.

* * * * *

UNITED STATES PATENT AND TRADEMARK OFFICE
CERTIFICATE OF CORRECTION

PATENT NO. : 5,240,574
DATED : August 31, 1993
INVENTOR(S) : Werner FUSS et al

It is certified that error appears in the above-indentified patent and that said Letters Patent is hereby corrected as shown below:

On the title page, Item [75], Line one, change
" Fub " to -- Fuss --.

Signed and Sealed this

Thirty-first Day of May, 1994

Attest:

BRUCE LEHMAN

Attesting Officer

Commissioner of Patents and Trademarks